United States Patent [19]

Ito et al.

[11] 4,091,266
[45] May 23, 1978

[54] ELECTRICAL CIRCUIT FOR CONTROLLING A TEMPERATURE OF A HEATING ELEMENT

[75] Inventors: Shinichi Ito; Toshiharu Tanaka; Noriaki Wakabayashi, all of Kadoma, Japan

[73] Assignee: Matsushita Electric Industrial Co., Ltd., Osaka, Japan

[21] Appl. No.: 674,674

[22] Filed: Apr. 7, 1976

[30] Foreign Application Priority Data

Apr. 8, 1975   Japan ................................. 50/43094
Apr. 8, 1975   Japan ................................. 50/43095

[51] Int. Cl.² ............................................. H05B 1/02
[52] U.S. Cl. .................................. 219/504; 219/490; 219/501

[58] Field of Search ............... 219/490, 494, 497, 499, 219/501, 504, 505

[56] References Cited

U.S. PATENT DOCUMENTS

| 3,461,273 | 8/1969 | Dykes | 219/501 |
|---|---|---|---|
| 3,571,564 | 3/1971 | Welch | 219/501 |

*Primary Examiner*—J. V. Truhe
*Assistant Examiner*—Fred E. Bell
*Attorney, Agent, or Firm*—Lowe, King, Price & Markva

[57] ABSTRACT

A switching means detects a malfunction due to an open circuited or broken state of a temperature sensing element. The switching means overrides a normal control by the temperature sensing element of a heater, so the heater is de-energized by the switching means and possible uncontrolled, dangerous activation of the heater is prevented.

12 Claims, 5 Drawing Figures

ELECTRICAL CIRCUIT FOR CONTROLLING A TEMPERATURE OF A HEATING ELEMENT

This invention relates generally to an electrical circuit for controlling the temperature of a heating element, and more particularly to such an electrical circuit provided with safety means for completely de-energizing the heating element when a temperature sensing element malfunctions because it is open circuited or is not effectively connected in circuit.

An object of the present invention is to provide an improved electrical circuit for controlling temperature of a heating element, which electrical circuit includes switching means for detecting a open circuited or broken state of a temperature sensing means to completely de-energize the heating element in spite of a signal fed from a temperature control circuit so as to prevent a dangerous overheat of the heating element.

In duplicating machines, especially using xerography, a heating element is provided for fusing charged dry ink particles on a copy paper. If the heating element becomes uncontrollable, there is a possibility of danger, resulting from a fire. This invention is concerned with an electrical circuit for avoiding such a dangerous possibility.

This and other objects, features and many of the attendant advantages of this invention will be appreciated more readily as the invention becomes better understood by the following detailed description, when considered in connection with the accompanying drawings, wherein like parts in each of the several figures are identified by the same reference characters, and wherein.

Figure 1:
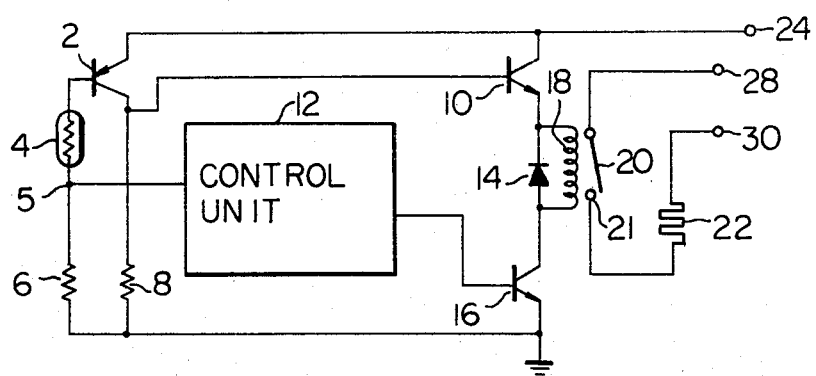
FIG. 1 is a schematic illustration of a first preferred embodiment of the present invention.

Reference is now made to drawings, first to FIG. 1, in which a first preferred embodiment of the present invention is schematically illustrated. Prior to discussing the electrical function of the embodiment of FIG. 1, it is assumed that a temperature sensing element 5, such as a thermistor, is connected to the remainder of the circuit and is operating correctly so that an electrical current flows through the element 4, via the base of PNP transistor 2, and resistor 6. Temperature sensing element 4 and the resistor 6 form a voltage divider, having a tap 5 at which is derived a voltage that varies in magnitude as a formation of ambient temperature and is supplied to a control unit 12. Control unit 12, usually a Schmitt circuit well known in the art, generates a pulsating signal having a pulse width determined by the magnitude of the voltage supplied to it from tap 5 and therefore a function of the ambient temperature sensed by the element 5.

With the assumption that the element 4 is connected properly to the remainder of the circuit and is correctly operating so it is not open circuited, transistor 2, conducts current between its emitter and collector from a positive DC bias source (not shown) at terminal 24 to ground through resistor 8 so that the voltage at the collector of the transistor 2 is equal to or approximately equal to the potential at terminal 24. A DC connection from the collector of transistor 2 to the base of NPN transistor 10 forward biases the latter so it is conductive. The pulsating output signal from the control unit 12 is supplied to the base of NPN transistor 16 to open or close the emitter collector path thereof.

The circuit of FIG. 1 is designed such that, if the ambient temperature sensed by element 4 is below a predetermined value an electric heater 22 should be energized. To this end, when the voltage at tap 5 is lower than a predetermined value, control unit 12 generates a signal which drives transistor 16 into a conductive state. When transistor 16 is thus rendered conductive, an electrical current flows from terminal 24 through transistor 10, relay coil 18, and transistor 16 to ground. In response to the current flowing through coil 18 relay arm 20 is closed, so that current flows through heater 22 from a suitable power source (not shown) connected between terminals 28 and 30. Diode 14, connected in parallel with coil 18, blocks a surge current that occurs when relay arm 20 opens from relay contact 21 as is well known in the art.

When the ambient temperature sensed by element 4 rises in response to energization of heater 22, the voltage at tap 5 above a predetermined value which causes control unit 12 to generate an output signal which renders the transistor 16 non-conductive. With transistor 16 non-conductive, relay so that the relay contact 20 is open circuited from relay contact 21 to de-energize the heater 22. Thus, the temperature control of the heater 22 is properly performed.

However, if the temperature sensing element 4 does not function properly because it becomes open circuited or is disconnected from the remainder of the circuit, the base current of the transistor 2 is blocked, which renders the transistor 10 non-conductive. Therefore, the heater 22 is not energized even if transistor 16 receives a signal causing its emitter collector path to be closed. If transistors 2 and 10 are not provided in the FIG. 1 circuit arrangement, there is a very dangerous possibility that control unit 12 will continue to energize heater 22, with a high probability the apparatus equipped with such a circuit becoming overheated, which could cause the outbreak of a fire.

Figure 2:
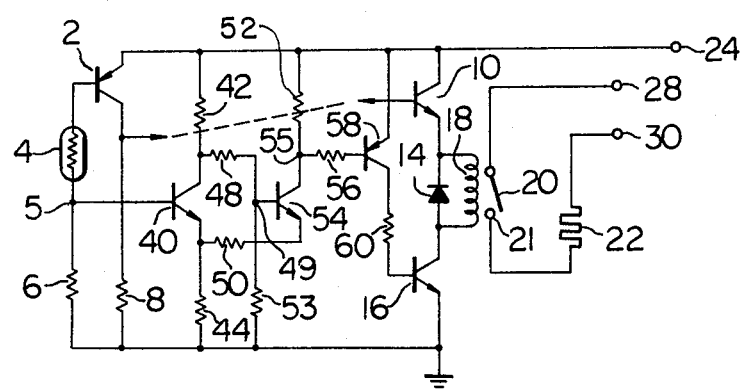
FIG. 2 is a schematic illustration a detailed circuit arrangement of the embodiment of FIG. 1.

Reference is made to FIG. 2, wherein a specific embodiment of the circuit of FIG. 1 is illustrated, and in which two transistors 40 and 54 form the principle part of a Schmitt circuit. Transistor 58 serves as a switching element to control the "on" and "off" operations of transistor 16 under the control of transistors 40 and 54. In operation, when ambient temperature is so low that the voltage appearing at tap 5 is less than a predetermined value, the collector voltage of transistor 40, across resistor 42, forward biases the base of transistor 54 with a voltage that is coupled to the latter via a voltage divider including resistors 48 and 53. In response to transistor 54 being forward biased, current flows through resistor 52, transistor 54, and resistors 50 and 44. Then voltage appearing at tap 55 at the collector of transistor 54 is supplied through resistor 56 to the base of transistor 58 to render it conductive. Thus, current commences to flow through the transistor 58 and a resistor 60, causing transistor 16 to become conductive. As consequence, the heater 22 is energized as previously described in detail.

In contrast, when the ambient temperature rises above a predetermined value, the elevated voltage at tap 5 causes transistors 40 and 54 to become respectively conductive and non-conductive, thereby to render transistors 58 and 16 non-conductive, to de-energize heater 22. Thus, the temperature control of the heater 22 is properly performed.

In the embodiment of FIG. 2, if the temperature sensing element 4 malfunctions by becoming effectively disconnected from the remainder of the circuit, transistors 2 and 10 are both rendered non-conductive as previously described in connection with FIG. 1. Thus, energization of heater 22 is forcibly stopped despite the derivation by transistor 58 of a signal that forward biases the emitter base path of transistor 16 which normally would cause the heater to be energized. Thereby the abnormal temperature rise discussed above is positively avoided.

Figure 3:
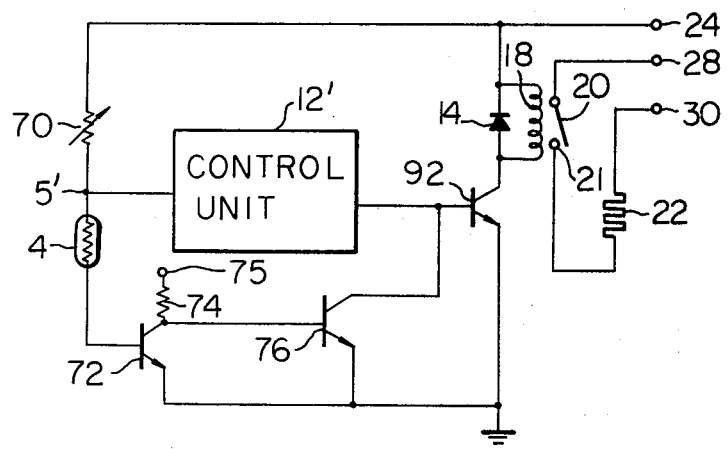
FIG. 3 is a schematic illustration of a second preferred embodiment of the present invention.

Reference is now made to FIG. 3, wherein another preferred embodiment of the present invention is schematically illustrated. Initially, it is assumed that temperature sensing element 4 is functioning properly so that current from a d.c. power source (not shown) connected to terminal 24 flows variable resistor 70, element 4, and the base emitter junction of transistor 72 to ground, so that transistor 72 is conductive. The voltage at tap 5' of a voltage divider including resistor 70 and element 4, indicative of ambient temperature sensed by element 4, is coupled to control circuit 12', having an output that is coupled to the base of transistor 92. The collector of transistor 92 is connected to a circuit including coil 18, contacts 20 and 21, and diode 14 for energizing heater 22.

The base of transistor 92 is also responsive to the voltage at the base of transistor 72, having its collector connected through resistor 74 and terminal 75 to a suitable d.c. power source (not shown). Because the transistor 72 is conductive, the collector voltage thereof is substantially at ground potential, so that transistor 76 is non-conductive. The base of transistor 92, connected directly to the collector of transistor 76, is therefore responsive to the output signal from control unit 12'.

In the above, when the ambient temperature is reduced to such an extent that heater 22 should be energized, the voltage at a tap 5' rises due to the negative temperature coefficient of the thermistor that forms temperature sensing element 4. Therefore, control unit 12' generates a signal which renders transistor 92 conductive. Thus, current flows through relay coil 18 and transistor 92 from the suitable d.c. power source (not shown), to close the relay arm 20 and heater 22 is energized. Because there has been a detailed description of the energization of the heater 22, further discussion thereof is omitted for brevity.

Contrary to the above, when the ambient temperature rises to a predetermined value in response to the energization of heater 22, there is a reduction of the voltage at tap 5'. The control unit 12' senses this voltage variation to generate a signal which renders transistor 92 non-conductive, thereby to de-energize the heater 22.

In the FIG. 3 embodiment, when temperature sensing element 4 malfunctions so it is not effectively in circuit (in which case the energization of heater 22 is not controlled to invite a very dangerous condition, transistor 72 is rendered non-conductive because no base current path is extant. Once transistor 72 is rendered non-conductive, the collector voltage thereof is suddenly elevated to render transistor 76 to cause the base of the transistor 92 to be substantially grounded, so that transistor 92 becomes non-conductive and unresponsive to the signal derived from control unit 12'. Thus, heater 22 cannot be energized until element 4 is replaced or properly connected in circuit. It is understood from the foregoing that the dangerous condition can be easily and certainly avoided by the provision of the transistors 72 and 76.

Figure 4:
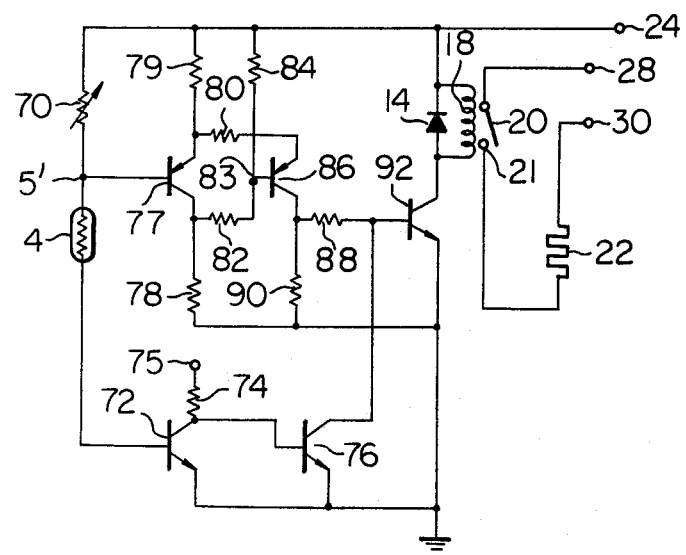
FIG. 4 is a schematic illustration of a detailed circuit arrangement of the embodiment of FIG. 3.

In FIG. 4, a detailed circuit arrangement of the embodiment of FIG. 3 is illustrated, If the ambient temperature is sufficiently low that heater 22 should be energized, the voltage at tap 5' is relatively high to cut off transistor 77, of a Schmitt circuit including transistor 86. In response to transistor 77 being cut off, transistor 86 conducts so current flows through it via resistors 79, 80 and 90. The base voltage of the transistor 86 is determined by the voltage at tap 83 of a voltage divider consisting of resistors 84, 82, and 78. In response to the conducting state of the transistor 86, current flows to the base of transistor 92 through resistor 88, thereby to render transistor 92 and energize the heater 22.

When the ambient sensed by element 4 rises to a predetermined value in response to energization of heater 22, the voltage at tap 5' is reduced, causing transistors 77 and 86 to be conductive and non-conductive, respectively. Therefore, no current flows to the base of transistor 92 to cut off the transistor and de-energize heater 22.

The case where the temperature sensing element 4 of FIG. 4 is effectively not functioning is fully discussed in connection with FIG. 3, so that further description will be omitted for brevity.

Figure 5:
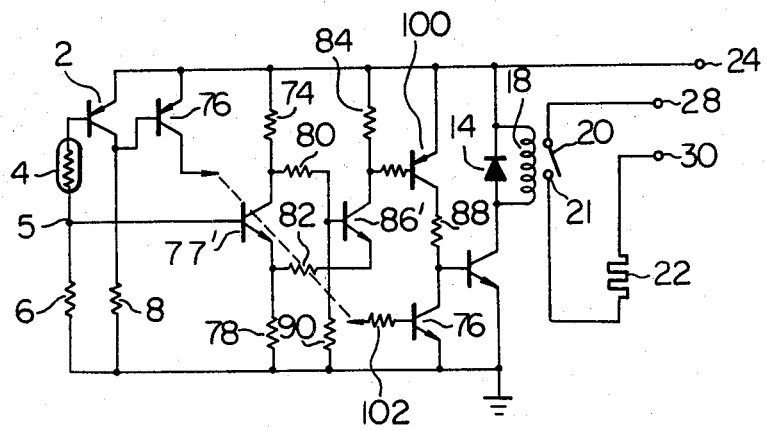
FIG. 5 is a schematic illustration of another detailed circuit arrangement of the embodiment of FIG. 3.

Reference is now made to FIG. 5, which resembles the embodiment of FIG. 4, except that (1) the transistors 77 and 86, each of which is a PNP-type, are replaced by transistors 77' and 86' of a NPN-type, respectively, (2) resistor 90 is replaced by potentiometer 90', (3) additional elements (that is, transistor 100 and resistor 102) connected to the slider of potentiometer 90' are provided, (4) the connection of temperature sensing element 4 is changed, and (5) adjustable resistor 70 is replaced by the fixed resistor 6 and the adjusting feature is assumed by the slider of potentiometer 90'. The function of the embodiment of FIG. 5 is identical to that of FIG. 4, so that further detailed description will be omitted for clarity.

From the foregoing, it is understood that if heater 22 becomes uncontrollable due to a broken or effectively non-conducting state of temperature sensing element 4, the heater 22 is positively de-energized until the temperature sensing element is replaced or the conducting state is restored, whereby a dangerous possibility of overheating or firing can be avoided by a simple circuit.

The present invention has been described in connection with certain preferred embodiments however, it is appreciated that various changes may be made in the various components and circuits without departing from the intended scope of the present invention as defined by the appended claims.

What is claimed is:

1. An electrical circuit for controlling the temperature of a heating element, which circuit comprises:
   a temperature sensing means responsive to ambient temperature, said temperature sensing means having a variable resistance responsive to the sensed temperature;
   a resistor connected in series with said temperature sensing means to form a voltage divider therewith;

control means connected to said voltage divider for receiving a divided voltage generated therein and for generating a signal dependent on said divided voltage;

first switching means connected to said control means and responsive to said signal therefrom to perform "on" and "off" operations;

second switching means responsive to non-existence of an electrical current flowing through said temperature sensing means to change its switching condition; and third switching means connected to said heating element and being controlled by said first and second switching means for controlling the energization of said heating element, wherein said third switching means comprises a relay, and said first and second switching means respectively comprise first and second switching transistors connected in series with said relay.

2. An electrical circuit claimed in claim 1 in which said second switching means further comprises a third transistor having a base connected to said divider, said electrical current, which flows through said temperature sensing element, also flowing through the emitter and base of said third transistor, the "on" and "off" operations of said second switching transistor being controlled by a potential of the collector of said third transistor.

3. Apparatus for controlling the activation of a heating element in response to ambient temperature and for preventing activation of the heating element in response to malfunctions due to an open circuit of a sensor having a variable resistance as a function of the ambient temperature or due to an open circuit of a circuit in which the sensor is connected comprising DC voltage divider means including the sensor and a series connected resistor, said divider means including a tap at which DC voltage is derived indicative of the sensed temperature, control means connected to be responsive to the voltage of the tap for normally activating the heating element so the heating element is respectively energized and de-energized in response to the sensed ambient temperature being below and above predetermined levels, means connected in series with the voltage divider for supplying current to the divider and for detecting the open circuit malfunctions, said detecting means including means for deriving a signal having first and second levels in response to the malfunction respectively being and not being detected, means responsive to the second level for enabling the control means to normally activate the heating element, and means responsive to the first level for disabling the control means and for preventing activation of the heating means.

4. The apparatus of claim 3 wherein the means for supplying includes an emitter base path of a transistor having an output electrode at which is derived the signal having first and second levels, said emitter base path being forward biased by a DC power supply for the voltage divider when the malfunction does not occur.

5. The apparatus of claim 4 wherein the base and emitter of the transistor are respectively connected to the sensor and a first terminal of the DC power supply at one end of the voltage divider, a second terminal of the DC power supply being connected to the other end of the voltage divider.

6. The apparatus of claim 5 wherein a resistor of the voltage divider is connected between the tap and the second terminal, and the sensor is connected between the tap and the base of the transistor.

7. The apparatus of claim 6 wherein the control circuit includes a further transistor having a pair of output electrodes in series with an activator of the heating element, said enabling means including another transistor having emitter collector electrodes in series with the output electrodes for enabling current to flow to the output electrodes and the activator in response to the second level being derived and for preventing the flow of current to the output electrodes and the activator in response to the first level being derived.

8. The apparatus of claim 6 wherein the control circuit includes a further transistor having a pair of output electrodes in series with an activator of the heating element, said further transistor further including a control electrode normally responsive to a control signal indicative of the sensed temperature being above and below the pre-determined levels, said enabling means including a bi-state transistor having emitter collector electrodes for enabling the control electrode to be responsive to the control signal in response to the second level being derived and for preventing the control electrode from being responsive to the control signal in response to the first level being derived.

9. The apparatus of claim 8 wherein the emitter collector electrodes of the bistable transistor shunt the control electrode.

10. The apparatus of claim 3 wherein the control circuit includes switching circuit means having a pair of output electrodes in series with an activator of the heating element, said enabling means including a bi-state device connected in series with the output electrodes for enabling current to flow to the output electrodes and the activator in response to the second level being derived and for preventing the flow of current to the output electrodes and the activator in response to the first level being derived.

11. The apparatus of claim 3 wherein the control circuit includes switching circuit means having a pair of output electrodes in series with an activator of the heating element, said switching circuit means further including a control electrode normally responsive to a control signal indicative of the sensed temperature being above and below the pre-determined levels, said enabling means including a bi-state device for enabling the control electrode to be responsive to the control signal in response to the second level being derived and for preventing the control electrode from being responsive to the control signal in response to the first level being derived.

12. The apparatus of claim 11 wherein the device shunts the control electrode.

* * * * *